United States Patent [19]

Greene

[11] Patent Number: 4,784,511
[45] Date of Patent: Nov. 15, 1988

[54] CONNECTOR FOR TUBULAR FRAME MEMBERS

[75] Inventor: Michael W. Greene, Incline Village, Nev.

[73] Assignee: Little Lake Industries, Incline Village, Nev.

[21] Appl. No.: 61,835

[22] Filed: Jun. 12, 1987

[51] Int. Cl.$^4$ .............................................. F16D 1/00
[52] U.S. Cl. ..................................... 403/169; 403/217
[58] Field of Search ...................... 403/169, 176, 217

[56] References Cited

U.S. PATENT DOCUMENTS 2,767,002  10/1956  Schwinn ............................ 403/169
2,980,454  4/1961   Thadein ............................. 403/169

Primary Examiner—Andrew V. Kundrat
Attorney, Agent, or Firm—Townsend and Townsend

[57] ABSTRACT

A connector for quickly and easily connecting the tubular frame parts of a chair, table or other structure made up of a number of tubular frame members which are in proximity to each other at various locations on the structure. The connector includes a pair of parallel bars interconnected by a central element, first ends of the bars being insertable in a first tubular member and secured by screws bearing against the inner surface of the first member. The second end of one of the bars extends into a second tubular member extending transversely of the first member, and a screw is used to couple the second member to the second end of the one bar. The second end of the second bar extends into a third tubular member axially of the same, and a screw is used to secure the third member to the second bar.

20 Claims, 2 Drawing Sheets

CONNECTOR FOR TUBULAR FRAME MEMBERS

This invention relates to improvements in the connection of structural parts, such as the frame members of chairs, tables and the like and, more particularly, to an improved connector for tubular frame members which converge toward each other at a common location.

BACKGROUND OF THE INVENTION

Chairs and tables and other structures made especially for patio and lawn use are typically comprised of frame members which are connected together in some suitable fashion, generally by nuts and bolts, to simplify the assembly of the frame members. For the most part, these frame members are coupled together at a factory before being shipped to retailers remote from the factory. This manner of assembly and shipping has been followed for many years to avoid having to assemble the frame members by the retailers or by purchasers of the structures formed when the frame members are assembled. In many cases, the designs of such structures require some expertise in the assembly to assure proper connection of adjacent frame members as well as to eliminate te need for assembly by the retailers or purchasers. While this is satisfactory in many cases, assembly by the supplier of the structures adds to the overall cost of the structures and this cost is passed on to the retailers or purchasers.

It has come to the attention of suppliers of structures of this type that, if chairs, for instance, could be shipped in a knocked down condition and then quickly assembled either by retailers or purchasers, the cost of the chairs could be reduced so that the price would be more attractive to the retailers and purchasers. As a result, a greater volume of chairs would be sold. However, to achieve this aim, it has been determined that a need exists for means for quickly assembling the frame members of chairs and the like while providing a positive connection between the frame members. The present invention satisfies this need.

SUMMARY OF THE INVENTION

The present invention provides a connector for quickly and easily connecting the separable parts of a chair, table or other structure made up of a number of tubular frame members which are in proximity to each other at various locations on the structure. To this end, the connector of the present invention includes a pair of parallel bars interconnected by a central element, first ends of the bars being insertable in a first tubular member and secured to the first tubular member by screws bearing against the inner surface of the first tubular member in a manner to lock the connector to the first tubular member.

The second end of one of the bars extends into a second tubular member extending transversely of the first tubular member, and a screw is used to couple the second tubular member to the second end of the one bar. The second end of the second bar extends into a third tubular member axially of the same, and a screw is used to secure the third tubular member to the second bar. Assembly of the three tubular frame members using the connector can be made quickly and easily merely by inserting the bars of the connector into the respective tubular members and then tightening the respective screws for securing the connector to each frame member and thereby coupling the frame members rigidly together.

A connector can be used at each of a number locations at which the three frame members are in proximity to each other. A screw driver is the only tool required to couple the connector to the frame members, and a single person can assemble and secure the screws in place without the need for assistance.

The connector itself can be of any suitable construction, such as a body made of wood, metal or plastic. Preferably for strength and weight purposes, it is formed of a cast metal, such as aluminum. The connectors when in place provide a positive attachment at the various locations at which the connectors are located yet the connectors are strong and durable and can carry heavy weight over a long period of time.

The primary object of the present invention is to provide a connector for quick attachment to the separable, tubular frame members of a structure, wherein the connector can be used to quickly assemble the frame members to thereby minimize shipping and production costs while minimizing space requirements for shipping the structure.

Another object of the present invention is to provide a structure comprised of a number of tubular frame members which are assembled by interconnecting the frame members at several spaced apart locations whereby the structure can be quickly and easily assembled after being shipped in a knocked down condition to thereby minimize production and shipping costs as well as to provide positive attachments at the various locations where the frame members are interconnected.

Other objects of this invention will become apparent as the following specification progresses, reference being had to the accompanying drawings for an illustration of the invention.

In the Drawings

FIG. 1 is a perspective view of a chair made of tubular frame members with which the connector of the present invention can be used at various locations on the chair;

FIG. 2 an enlarged, fragmentary perspective view of the connector of the present invention, showing the way in which it is used to connect three different tubular frame members of a structure, such as the chair of FIG. 1;

Figure 1:
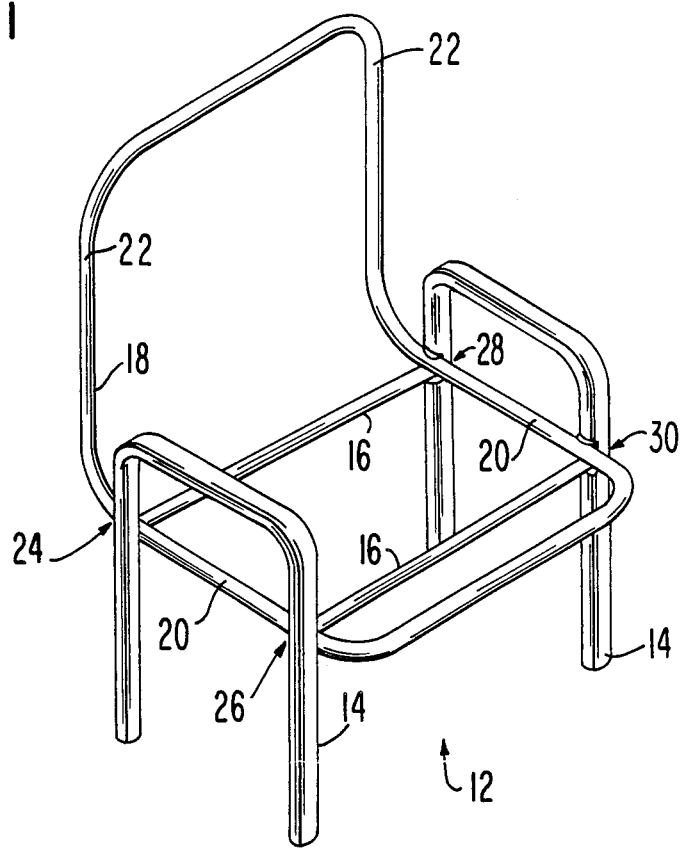
Figure 3:
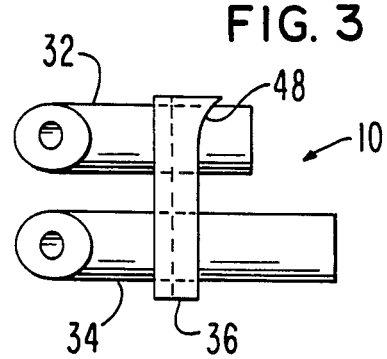
FIG. 3 is a side elevational view of the connector of the present invention.
Figure 4:
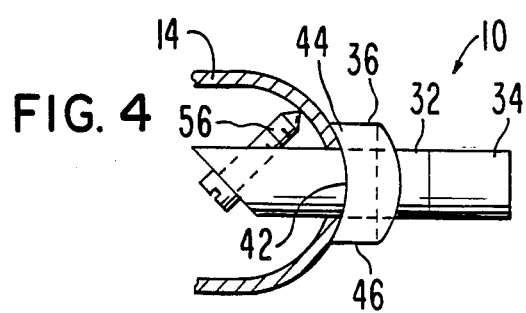
FIG. 4 is a plan view or the connector.

The connector of the present invention is broadly denoted by the numeral 10 and is shown in FIGS. 3 and 4. Connector 10 is adapted to interconnect three tubular members which are joined together at a common location. For purposes of illustration, the connector is suitable for use with the tubular members of a chair 12, such as a lawn chair of the type shown in FIG. 1.

Chair 12 includes a pair of tubular leg members 14 which are in the shape of an inverted U, and a pair of cross frame members 16 which interconnect the leg frame members 14. Finally, the chair is comprised of a tubular frame member 18 having horizontal parts 20 for forming the side margins of the seat portion of the chair and upright parts 22 which form the side margins of the back of the chair. The chair 12 has four locations denoted by the numerals 24, 26, 28 and 30 at which the three sets of frame members 14, 16 and 18 are in proximity to each other. It is at each of these locations that a connector 10 is provided to interconnect the three frame members in proximity to each other. Thus, a description of the connector 10 at one of locations 24, 26, 28 and 30 will suffise for a description of the other connectors 10 at the other locations.

The connector 10 includes a pair of rigid bars 32 and 34 which are rigidly secured to a central member 36 between the ends of bars 32 and 34. Typically, the bars 32 and 34 are circular in cross-section; however, they could be of other shapes if desired. The bars 32 and 34 and central member 36 are rigidly connected to each other so as to form a substantially one-piece construction. The material for connector 10 can be of metal, plastic or wood. Preferably, it is of cast metal, such as cast aluminum for strength and light weight characteristics.

Central member 36 has a curved side surface 42 which extends between a pair of end points 44 and 46. On the opposite side of the member 36 a curved surface 48 is provided. Surfaces 46 and 48 are provided to engage adjacent frame members as hereinafter described.

Figure 2:
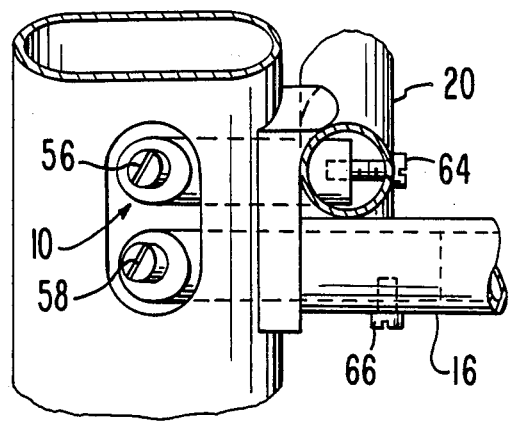
Figure 5:
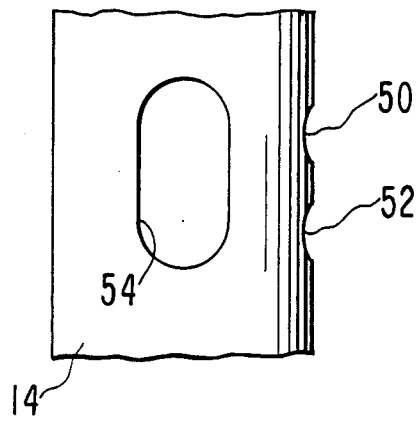
FIG. 5 is a fragmentary elevational view of one side of one frame members of FIG. 2.
Figure 6:
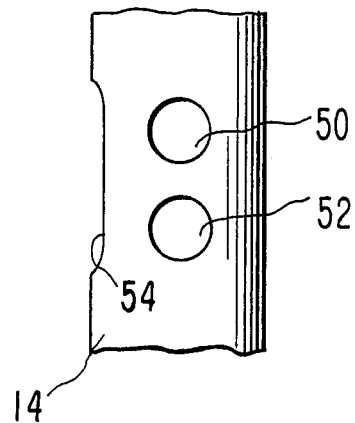
FIG. 6 is a fragmentary elevational view of another side of the frame member of FIG. 5.

Frame member 14 (FIGS. 5 and 6) is of any suitable cross-section such as an oval cross-section shown in FIG. 2. Frame member 14 has a pair of vertically spaced holes 50 and 52 as shown in FIGS. 5 and 6. These holes are adapted to partially receive bars 32 and 34 which extend into frame member 14 as shown in FIG. 2 so that the inner ends of bars 32 and 34, when inserted into frame member 14, will be observable through an elongated slot or hole 54 (FIG. 5). When bars 32 and 34 are fully inserted into frame member 14, surface 42 of member 36 is complimental to and engages the adjacent outer surface portion of frame member 14 as shown in FIG. 4.

Bars 32 and 34 have screws 56 and 58 threadably coupled thereinto with the screws being in an angle as shown in FIG. 4. The screws can be adjusted by use of a screwdriver extending through slot 54. The screws bear against the inner surface of frame member 14 and provide leverage to thereby secure the central member 36 tightly in engagement with the outer surface of frame member 14, thereby coupling the frame member 14 to connector 10 in a positive manner.

Figure 7:
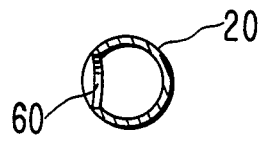
FIG. 7 is a cross-sectional view of a second frame member of FIG. 2.
Figure 8:
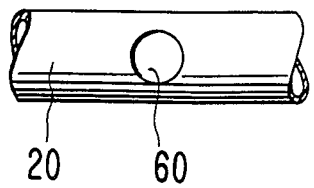
FIG. 8 is a side elevational view of the frame member of FIG. 7.

A frame member 20 to be coupled to frame member 14 has a side hole 60 (FIGS. 7 and 8). Bar 32 of connector 10 extends into hole 60 and the bar has a bore 62 in the end thereof for receiving a screw 64 having a head at the outer side of frame member 20 as shown in FIG. 2.

Bar 34 is adapted to be partially received in a tubular member 16. A screw 66 extends through a hole in the bottom portion of frame member 16 and into bar 40 to interconnect the bar and frame member 16. When bars 32 and 34 are in frame members 20 and 16, respectively, the surface 48 of central member 36 complimentally engages the adjacent outer surface portion of frame member 20 as shown in FIG. 2.

In use, a connector 10 is provided at each of the four locations 24, 26, 28 and 30, respectively of chair 12 or any other system using tubular frame members which meet at a common location or a series of locations. Screws 56, 58 and 64 and 66 are manipulated to attach connector 10 releasably to the frame members as shown in FIG. 2. When so attached, connector 10 provides a rigid joint which will withstand heavy weight, such as the weight of a person sitting in the chair 12. Connector 10 allows a structure, such as a chair or table, to be shipped in a disassembled condition and to be quickly and easily assembled by putting the screws 56, 58, 64 and 66 in place, all of which can be done in a matter of minutes.

I claim:

1. A connector for a number of tubular frame members converging to a common location comprising: a connector body having a pair of spaced bars and means coupling the bars together, first ends of the bars being insertable into a first frame member a second end of one of the bars being insertable into a second frame member and the second end of the other bar being insertable into the third member; and means coupled with the bars for securing the body to the first, second and third frame members.

2. A connector as set forth in claim 1, wherein the bars are generally parallel with each other.

3. A connector as set forth in claim 1, wherein one of the bars is shorter in length than the other bar.

4. A connector as set forth in claim 1, wherein said means coupled with the bars include a coupler element integral with the bars.

5. A connector as set forth in claim 4, wherein the coupler element has a pair of opposed surfaces, a first surface of the coupler element being curved to conform to and to engage an outer surface portion of the first frame member, the opposite surface of the coupler element being curved to conform to and to engage an outer surface portion of the second tubular member.

6. A connector as set forth in claim 1, wherein said bars are generally parallel with each other, said securing means including first screw means on the first ends of the bars for engaging the inner surface of the first tubular member, second screw means for attachment to the end the second end of the one bar, and third screw means for securing the side of the other bar to the third frame member.

7. A connector as set forth in claim 6, wherein said first screw means extends at an angle relative to the longitudinal axis of the bars.

8. A connector as set forth in claim 1, wherein said body is formed from cast aluminum.

9. A connector as set forth in claim 1, wherein the bars are transversely circular and parallel with each other, a first end of each bar having a threaded hole there through, the hole being at an angle relative to the longitudinal axis of the bar, the second end of one of the bars having a threaded bore in the end face thereof for receiving a screw for coupling the bar to the second frame member, said other bar having a threaded side bore for receiving a screw for connecting the second bar to the third frame member.

10. A connector as set forth in claim 9, wherein said means coupled with the bars includes a coupler element rigid to the bars intermediate the ends thereof, one of the bars being shorter than the other bar, said one bar having an end for insertion into the second frame member, said coupler element having opposed, curved surfaces, one of the surfaces being complimental to and engageable with the first frame member and the other surface being complimental to and engageable with the second frame member.

11. In combination: three tubular frame members converging to a common location; and a connector having a pair of spaced bars and a means interconnecting the bars, first ends of the bars being insertable into a first frame member, a second end of one of the bars being insertable into a second frame member, and the second end of the other bar being insertable into the third member; and means coupled with the bars for securing the body to the first, second and third frame members.

12. The combination as set forth in claim 11, wherein the bars are generally parallel with each other.

13. The combination as set forth in claim 11, wherein one of the bars is shorter in length than the other bar.

14. The combination as set forth in claim 11, wherein said means coupled with the bars include a coupler element integral with the bars.

15. The combination as set forth in claim 14, wherein the coupler element has a pair of opposed surfaces, a first surface of the coupler element being curved to conform to and to engage the outer surface portion of the first frame member, the opposite surface of the coupler element being curved to conform to and to engage the outer surface portion of the second tubular member.

16. The combination as set forth in claim 11, wherein said bars are generally parallel with each other, said securing means including first screw means on he first ends of the bars for engaging the inner surface of the first tubular member, second screw means for attachment to the end the second end of the one bar, and third screw means for securing the side of the other bar to the third frame member.

17. The combination as set forth in claim 16, wherein said first screw means extends at an angle relative to the longitudinal axis of the bars.

18. The combination as set forth in claim 11, wherein said connector is formed from cast aluminum.

19. The combination as set forth in claim 11, wherein the bars are transversely circular and parallel with each other, a first end of each bar having a threaded hole there through, the hole being at an angle relative to the longitudinal axis of the bar, and the second end of one of the bars having a threaded bore in the end face thereof for receiving a screw for coupling the bar to the second frame member, said other bar having a threaded side bore for receiving a screw for connecting the second bar to the third frame member.

20. The combination as set forth in claim 19, wherein said means coupled with the bars includes a coupler element rigid to the bars intermediate the ends thereof, one of the bars being shorter than the other bar, said one bar having an end for insertion into the second frame member, said coupler element having opposed, curved surfaces, one of the surfaces being complimental to and engageable with the first frame member and the other surface being complimental to and engageable with the second frame member.

* * * * *